(12) United States Patent
Dickman et al.

(10) Patent No.: US 9,709,681 B2
(45) Date of Patent: Jul. 18, 2017

(54) DIGITAL BEAMFORMING FOR SIMULTANEOUSLY MITIGATING WEAK AND STRONG INTERFERENCE IN A NAVIGATION SYSTEM

(71) Applicants: Jeff Dickman, Thousand Oaks, CA (US); Mathew A. Cosgrove, Woodland Hills, CA (US)

(72) Inventors: Jeff Dickman, Thousand Oaks, CA (US); Mathew A. Cosgrove, Woodland Hills, CA (US)

(73) Assignee: Northrop Grumman Guidance and Electronics Company, Inc., Woodland Hills, CA (US)

( * ) Notice: Subject to any disclaimer, the term of this patent is extended or adjusted under 35 U.S.C. 154(b) by 1186 days.

(21) Appl. No.: 13/712,633

(22) Filed: Dec. 12, 2012

(65) Prior Publication Data

US 2013/0154880 A1 Jun. 20, 2013

Related U.S. Application Data

(60) Provisional application No. 61/576,205, filed on Dec. 15, 2011.

(51) Int. Cl.
*G01S 19/21* (2010.01)
*G01S 19/36* (2010.01)

(52) U.S. Cl.
CPC ............ *G01S 19/21* (2013.01); *G01S 19/215* (2013.01); *G01S 19/36* (2013.01)

(58) Field of Classification Search
CPC ......... G01S 19/21; G01S 19/215; G01S 19/36
See application file for complete search history.

(56) References Cited

U.S. PATENT DOCUMENTS

| | | | |
|---|---|---|---|
| 6,115,409 A | 9/2000 | Upadhyay et al. |
| 6,421,000 B1 | 7/2002 | McDowell |
| 6,952,460 B1 | 10/2005 | Van Wechel et al. |
| 6,999,027 B1 | 2/2006 | Stockmaster |
| 7,161,534 B2 | 1/2007 | Tsai et al. |
| 7,250,903 B1 | 7/2007 | McDowell |
| 2005/0228841 A1 | 10/2005 | Grobert |

(Continued)

OTHER PUBLICATIONS

International Search Report for corresponding PCT/US12/69505 completed Feb. 11, 2013 by Shane Thomas of ISA/US.

(Continued)

*Primary Examiner* — Cassie Galt
(74) *Attorney, Agent, or Firm* — Tarolli, Sundheim, Covell & Tummino LLP

(57) ABSTRACT

An adaptive cascaded electronic protection processing system for global navigation satellite system (GNSS) threat mitigation is provided. The system includes a precorrelation characterization component configured to provide at least one parameter characterizing a plurality of received signals. A correlator is configured to provide a plurality of correlation results, each representing one of the plurality of received signals. A spatial weight contribution component is configured to determine an optimal set of digital beamforming weights via an optimization process according to the at least one parameter. A postcorrelation characterization component is configured to determine at least one constraint on the optimization process according to the plurality of correlation results.

6 Claims, 3 Drawing Sheets

(56) References Cited

U.S. PATENT DOCUMENTS

2009/0066574 A1     3/2009   De Lorenzo et al.
2010/0033370 A1     2/2010   Lopez et al.

OTHER PUBLICATIONS

Anantharamu, et al.: "*Space-Time Equalization Techniques for New GNSS Signals*"; pp. 1-9.

Supplementary European Search Report for corresponding EP12858580 completed on Sep. 11, 2015.

Office Action dated Jun. 7, 2016 from corresponding JP 2014-547427.

Miura, et al.: "Maximal-Ratio-Combining Array Beamformer Assisted by a Training Sequence for Space Division Multiple Access in Power-Limited Channels"; IEICE Transactions on Communications, vol. 83, No. 2, Feb. 25, 2000, pp. 394-405.

DIGITAL BEAMFORMING FOR SIMULTANEOUSLY MITIGATING WEAK AND STRONG INTERFERENCE IN A NAVIGATION SYSTEM

RELATED APPLICATIONS

This application claims priority from U.S. Provisional Patent Application Ser. No. 61/576,205, filed 15 Dec. 2011, which is incorporated herein in its entirety.

TECHNICAL FIELD

This invention relates to navigation systems, and more particularly, to the use of digital beam-forming to mitigate both weak and strong interference in a navigation system.

BACKGROUND OF THE INVENTION

The fundamental baseband digital signal-processing component used in a global navigation satellite system (GNSS) receiver is known as a correlator. It correlates digitized samples of a received GNSS signal output by an analog-to-digital converter (ADC) with locally generated replicas of the carrier and spreading code components of the signal being received. If the local replica is adequately aligned with the carrier and code components of the received signal, a large correlation result is produced. The signal can be processed according to parameters of the signal derived from the aligned local replica, thereby providing observability of the actual received signal parameters whose power level can be well below that of thermal noise. Fundamentally, these received signal parameters are the magnitude of the despread signal and phase of its carrier with respect to the locally generated carrier.

SUMMARY OF THE INVENTION

In accordance with an aspect of the present invention, a cascaded electronic protection system for a global navigation satellite system (GNSS) is provided that maintains the capabilities of traditional beam forming systems for strong interference while adding a capability to mitigate weak interference which minimizes impact on measurement fidelity. Traditional digital beam forming electronic protection systems are historically designed to operate independently from a global navigation satellite system (GNSS) receiver and only address the strong interference sources distinct from thermal noise, but are challenged to deal with the weak ones which are below the thermal noise floor such as spoofing or meaconing. The cascaded approach utilizes covariance estimates from the digital signal samples as well as autocorrelation estimates from the correlators to calculate the optimal spatial and temporal weights to form nulls towards undesired emitters such as interference, jamming, spoofing, and meaconing while directing gain toward desired GNSS satellites. Cascading allows the electronic protection system to simultaneously mitigate weak and strong signal threats by combining multi-stream post-correlation spatial filtering and pre-correlation temporal filtering respectively within the GNSS receiver itself.

To this end, a precorrelation characterization component is configured to provide at least one parameter characterizing a plurality of received signals. A correlator is configured to provide a plurality of correlation results, each representing one of the plurality of received signals. A post-correlation spatial weight computation component is configured to determine an optimal set of digital beam-forming weights via an optimization process according to the at least one parameter. A post-correlation constraint component is configured to apply at least one constraint on the optimization process according to the plurality of correlation results In accordance with another aspect of the present invention, a second space time adaptive processing system for a GNSS system is provided. A pre-correlation characterization component is configured to provide at least one parameter characterizing a plurality of received signals. A digital antenna electronics component is configured to downconvert the received signal to an intermediate frequency, digitize the intermediate frequency signal into a stream of digital samples at an associated sampling rate, and downconvert the stream of digital samples to a baseband digital signal. A temporal filter for each baseband digital signal is configured to provide a temporal cancelation of emitters to mitigate narrow-band jamming using an adaptive minimization technique. A correlator is configured to provide a plurality of correlation results, with each correlation result representing one of the plurality of baseband digital signals. A spatial weight computation component is configured to determine an optimal set of digital beam-forming weights via an optimization process according to the at least one parameter to mitigate wideband jamming and weak signal threats. A post-correlation constraint component is configured to determine at least one constraint on one of several existing optimization techniques according to the plurality of correlation results.

In accordance with yet another aspect of the invention, a method is provided for adaptive processing in a navigation system. Temporal filtering is applied to each of a plurality of input streams to provide a plurality of filtered input streams which each mitigate temporally correlated interference. A covariance matrix representing the plurality of filtered input streams is generated. A plurality of correlation results is generated, each representing one of the plurality of filtered input streams. A beam-forming weight is calculated for each input stream from the covariance matrix and the plurality of correlation results to mitigate spatially correlated interference.

DETAILED DESCRIPTION

Figure 1:
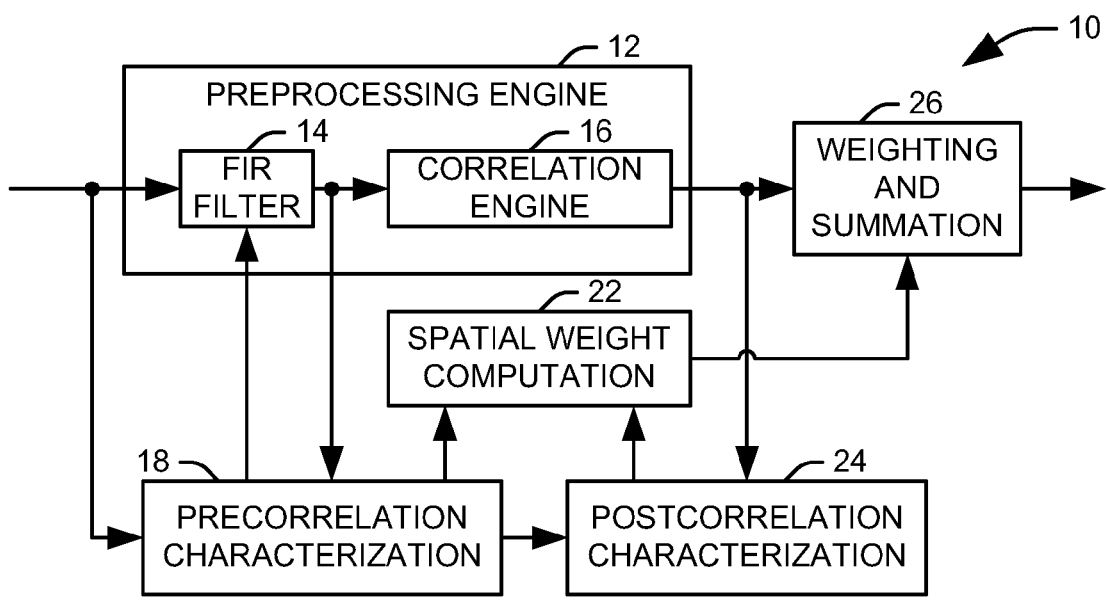
FIG. 1 illustrates a cascaded Electronic Protection (EP) assembly for a global navigation satellite system (GNSS) in accordance with an aspect of the present invention.

The present invention relates generally to electronic protection systems and can be implemented within any appropriate navigation system that relies on spread spectrum navigation systems. For the purpose of example, the foregoing description is drawn specifically to implementations of GNSS receivers, but it will be appreciated that the invention is generally applicable to any navigation system. The fundamental baseband digital signal processing component used in a GNSS receiver is known as a correlation engine, or correlator. A correlation engine correlates digitized samples of a received GNSS signal output by an analog-to-digital converter (ADC) with locally generated replicas of the carrier and spreading code components of the signal being received. If the local replica is adequately aligned with the carrier and code components of the received signal, a large correlation result is produced. The signal can be processed according to parameters of the signal derived from the aligned local replica, thereby providing observability of the actual received GPS signal parameters whose power level can be well below that of thermal noise. These received signal parameters represent the magnitude of the de-spread signal and phase of its carrier with respect to the locally-generated carrier.

In accordance with an aspect of the present invention, a post-correlation characterization of emitters is added to a spatial filtering process in order to identify threats that stay below the noise floor, and thus cannot be detected at the pre-correlation stage, but can still significantly degrade the tracking quality of GPS signals. These threats can include spoofers and meaconers. The post-correlation step first implements multi-directional beam-steering, with weights varied to steer the array beam simultaneously in multiple directions while nulling out those jamming sources that are characterized by the signal covariance matrix calculated at the pre-correlation step. If a signal energy peak is found in any steering direction other than the direction of the satellite, an interfering signal coming from that direction is identified. The procedure can be repeated for every value of the code phase from the open-loop search space to enable identification of emitters whose code phase differ from the direct signal by more than a code chip. It will be appreciated that multi-directional post-correlation beam-steering can be implemented at the correlator rate with weights applied in software to reduce the overall computational load.

Accordingly, the proposed GNSS receiver combines post-correlation and precorrelation data to achieve a complete view of potential threats to the integrity of the navigation system. Specifically, precorrelation estimation identifies the presence of jammers and includes estimation of the noise covariance matrix between individual antenna elements for the computation of digital beam-forming spatial weights. Post-correlation estimation is used to protect against emitters below the noise floor while mitigating broadband threats.

FIG. 1 illustrates a cascaded electronic protection (EP) system assembly 10 for a global navigation satellite system (GNSS) in accordance with an aspect of the present invention. The received signals from the various elements of the antenna are provided to a preprocessing engine 12 that prepares digital representations of the received signals for further processing. For example, each signal can be downcoverted at an analog downconverter to an intermediate frequency, and digitized into a stream of digital samples. These digitized input streams are then downconverted to baseband as respective in-phase, i(t), and quadrature, q(t), components.

The baseband in-phase and quadrature components can be used to represent a radio signal, s(t), as a complex vector (phasor) with real and imaginary parts. Two components are required so that both positive and negative frequencies, relative to the channel center frequency, can be represented:

$$s(t)=x(t)+jy(t) \qquad \text{Eq. 1}$$

For the stream of digital samples from each antenna element, the preprocessing engine 12 first provides a temporal cancelation of emitters at a bank of finite impulse response (FIR) filters 14 and subjects each input stream to a correlation with a replica GNSS code at a correlation engine 16. Filter coefficients for the back of FIR filters 14 are computed at a precorrelation characterization component 18 based on covariance between signal samples on different filter taps. Temporal filtering efficiently mitigates narrowband jamming and can utilize any one of several optimizations for computation of the filter coefficients such as an adaptive transversal filter or a least mean squares minimuzation.

The illustrated EP assembly uses a cascaded approach that separates temporal filtering and digital beam-forming operations. Accordingly, temporal filtering is carried out before the correlation process, whereas the digital beam-forming function is performed after the correlation. The cascaded implementation has a number of advantages such as reduction in the execution rate of the digital beam-forming, which results in reduced computational load, as well as capability for post-correlation characterization of RF environments, which enables identification of emitter signals that stay below the noise floor (such as spoofing and meaconing) and cannot be observed at pre-correlation.

A precorrelation component to the spatial filtering can be determined at a spatial weight computation component 22, which utilizes data from the precorrelation characterization component 18 to determine an optimal set of weights for digital beam-forming. For beam-forming, the complex baseband signals are multiplied by the complex weights to apply the phase shift and amplitude scaling required for each antenna element.

$$w_k = a_k e^{j\,\sin(\theta_k)} \qquad \text{Eq. 2}$$

where $w_k$ is the complex weight for a $k^{th}$ antenna element, $\theta_k$ is the phase shift of the weight, and $a_k$ is an amplitude of the weight.

The specific beam-forming algorithm utilized with the spatial weight computation component 22 can utilize any one of a number of optimization criteria for the computation of spatial array weights such as minimum variance (MV), minimum variance distortion-less response (MVDR), and adaptive filtering with bias constraints. Each of these algorithms for the computation of digital beam-forming weights generally requires characterization of the emitter signal environment. In the illustrated implementation, emitters are characterized by a multi-element signal covariance matrix that is computed based on both pre-correlation characterization 18 and post-correlation characterization 24. Signal covariance between different array elements can be computed based on down-sampled GPS signal at the output of the FIR filter bank 14. For emitter-free cases, this matrix has a diagonal form, but the presence of emitters introduces off-diagonal terms which can be minimized by optimization. Estimates of signal covariance are directly incorporated into the weight computation procedures for most optimization algorithms.

To provide the postcorrelation contribution to the weight computation, the temporally filtered outputs of the FIR filter bank 14 are fed into the correlation engine 16, which wipes-off code and carrier signals (for code and carrier parameters from a certain search space) and accumulates the results over a predetermined interval (e.g., one millisecond). The correlation results are provided to a postcorrelation characterization component 24 where outputs of individual antenna elements are combined for digital beam-forming to enable spatial cancellation of emitters. For example, the array beam can be steered in multiple directions using one millisecond correlation outputs. Local energy maxima in angular directions other than the satellite's identify emitter signals, and the digital beam-forming algorithms implemented at the spatial weight computation component 22 can be augmented by nulling constraints in order to suppress the influence of these additionally observed sources of interference on the signal tracking quality.

Each of the determined weights and the correlation results are provided to a weighting and summation component 26 that provides a weighted linear combination of the correlation results reflecting the determined digital beam-forming weights. The results of this weighted linear combination can then be provided to a navigation component (not shown) for further processing.

Figure 2:
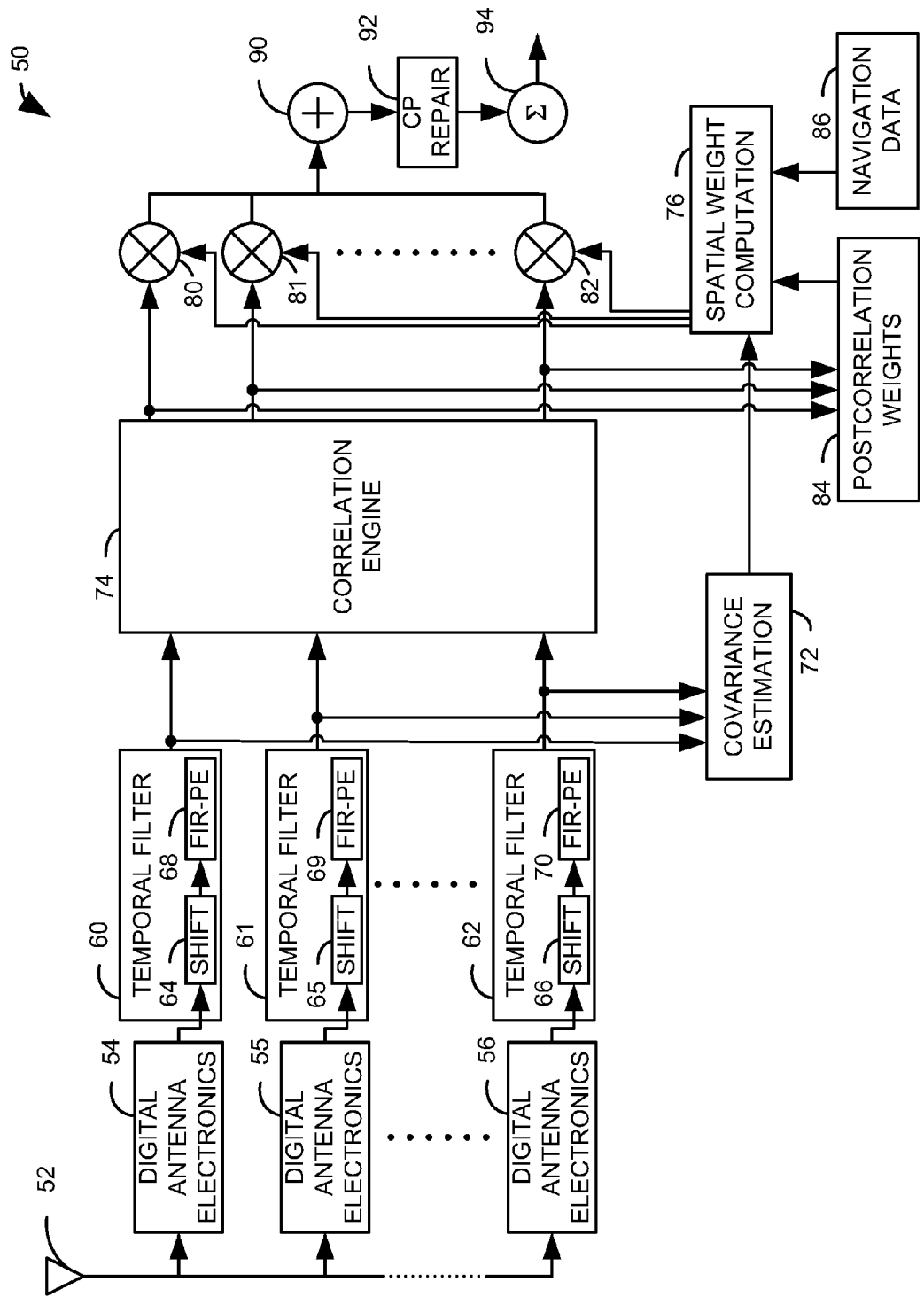
FIG. 2 illustrates one implementation of a global navigation satellite system (GNSS) receiver in accordance with an aspect of the present invention.

FIG. 2 illustrates one implementation of an electronic protection system 50 in accordance with an aspect of the present invention. The receiver 50 includes a multi-element antenna 52 that provides a plurality of received signals to respective digital antenna electronics (DAE) assemblies 54-56. In one implementation, the antenna 52 has seven elements, and produces a signal at each element. Each DAE assembly 54-56 prepares digital representations of the received signals for further processing. For example, each DAE can downconvert its received analog signal to an intermediate frequency, digitized the intermediate frequency signal into a stream of digital samples, and downconvert the digital signal to baseband.

The baseband digital samples are provided to a bank of temporal filters 60-62 which provides a temporal cancelation of emitters, as to mitigate narrow-band jamming. To this end, each input stream is provided to an associated shift register 64-66 that applies a coarse delay to the input streams. Specifically, the shift registers 64-66 can delay their respective input streams by integer increments of samples. A fine delay can be applied to each input stream at respective finite impulse processing elements (FIR-PE) 68-70. Temporal interference suppression is implemented in a form of finite impulse response (FIR) filter with adaptively selected weights. For discrete time $t_n$, the output of the (2N+1)-tap filter is defined as:

$$x_{FIR}(n)=\Sigma_{k=-N}^{N}a_k x(n+k) \quad \text{Eq. 3}$$

where x(n+k) is the signal samples at individual taps of the filter, and $a_k$ is the filter weight.

The resulting delayed input streams are provided to each of a covariance estimation component 72 and a correlation engine 74. The covariance estimation component 72 calculates a signal covariance matrix based on GPS signal samples, and an autocorrelation vector is precalculated and stored. The weights for the FIR-PE filter bank 68-70 are selected adaptively minimizing the filter output error via a technique such as the least mean-squares (LMS) where the tap weight vector is computed to minimize the filter output error using the sample variance and autocorrelation. Since signal samples of different taps are processed by exactly the same RF chain, the autocorrelation function is computed by representing the GPS signal as $x[n]=PRN(n)\cdot\sin(2\pi\cdot f_{IF}\cdot t_n)$, where PRN is a pseudorandom code and $f_{IF}$ is an intermediate carrier frequency after a down conversion at the DAE 54-56. The determined weights can be provide to the FIR-PE filter bank 68-70, as well as a spatial weight computation element 76.

The correlation engine 74 compares each signal stream to a replica GNSS code, representing an expected pseudorandom code in the received signal, to determine an associated correlation result for each signal stream representing its similarity to the replica code. The correlation results are provided to respective multipliers 80-82, as well as a post-correlation weight component 84 that determines the locations of emitters exhibiting interference below the noise floor (e.g., spoofers and meaconers). To this end, the post-correlation weight component 84 steers the array beam simultaneously in multiple directions to apply gain toward multiple satellites. The directions of any located emitters are identified by detection of multiple correlation peaks whose detection parameters are provided to the spatial weight computation element 76.

The spatial weight computation element 76 implements a digital beam-forming function (DBF) by optimizing the adaptive criteria with any supplied constraints for individual satellites, the location of which is provided by from associated navigation data 86. For instance, if the beam steering is optimized for all satellites in view, it significantly reduces the number of spatial nulls that can be generated for interference suppression: the total number of nulls is N–K where N is the number of antenna elements and K is the number of satellites. If the DBF is performed to optimize the jamming suppression only (i.e., without considering satellite signals) it increases the null availability to N–1 but can potentially degrade or cancel-out signal reception for some satellites. Integration of DBF into the signal tracking process eliminates these disadvantages. Specifically, undisturbed signal reception in the satellite's direction can be used as an optimization constraint. Similarly, if the postcorrelation weight component 84 finds strong emitter peaks, generation of spatial nulls in the emitter signal direction can also be added as an optimization constraint to the computation of spatial weights.

The spatial weight computation element 76 calculates spatial beam-forming weights in order to eliminate spatially-correlated jamming signals. This can be accomplished via any of a number of optimization algorithms, subject to the additional constraints imposed by the navigation data 86 and the postcorrelation weight component 84. These weights are provided as second inputs to the multipliers 80-82 and the outputs of the multipliers are summed at a summation component 90 to provide a final, spatially and temporally filtered correlation result.

It will be appreciated that, since the DBF is performed at the correlator level, carrier phase measurement fidelity is preserved. Specifically, since all phase manipulations are known to both the beam former and receiver, it is possible to explicitly compensate for carrier phase biases that are due to spatial beam-forming. This compensation is performed at a carrier phase repair component 92. It will be appreciated, however, that the phase repair can instead be performed implicitly, for example, as optimization constraints during the beam-forming process. The phase corrected sample can then be provided to an integrator 94, where correlation results are accumulated over an extended period for retrieval by an associated navigation system (not shown).

Figure 3:
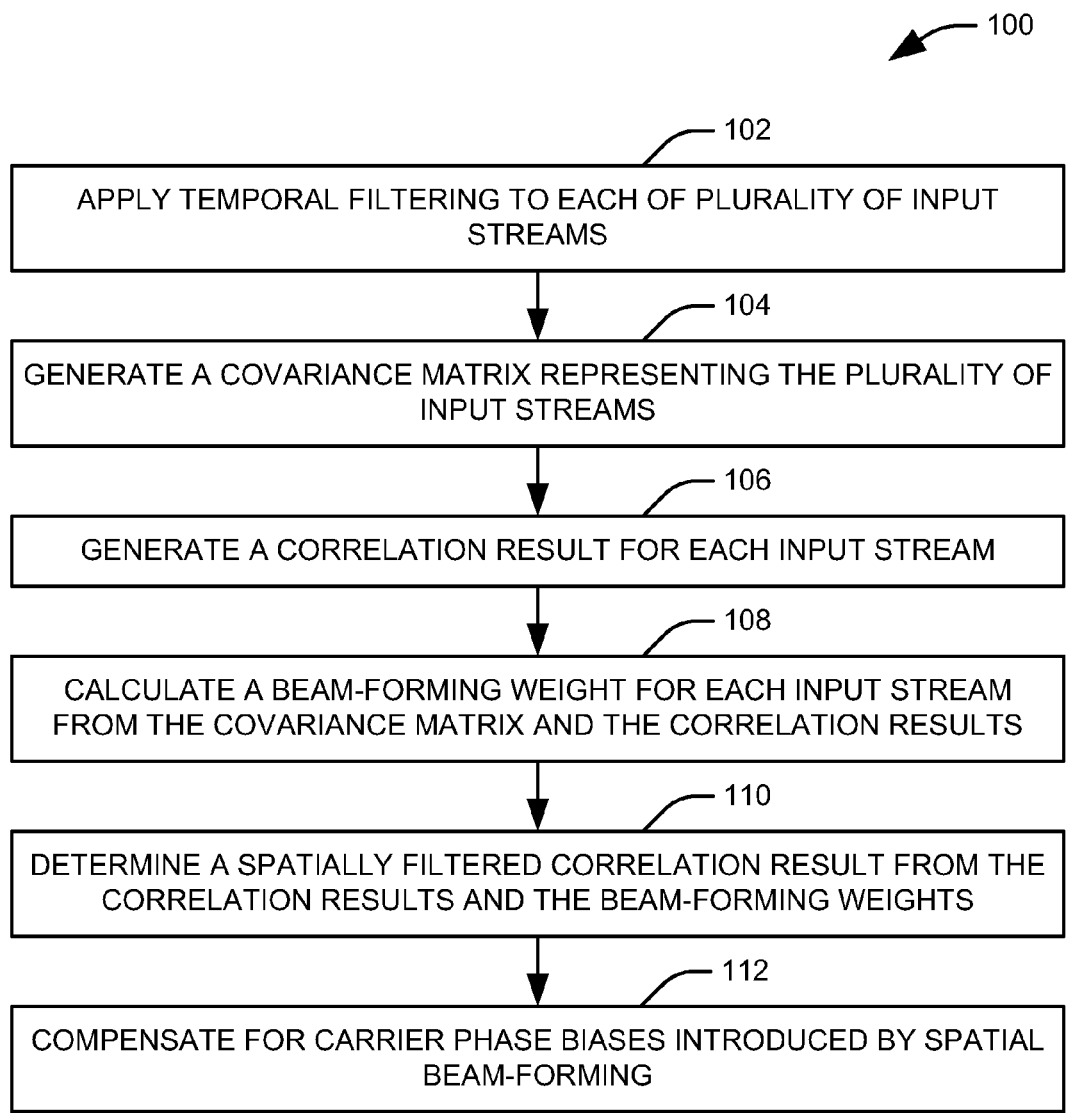
FIG. 3 illustrates a method for adaptive processing in a navigation system in accordance with an aspect of the present invention.

In view of the foregoing structural and functional features described above, a methodology in accordance with various aspects of the present invention will be better appreciated with reference to FIG. 3. While, for purposes of simplicity of explanation, the methodologies of FIG. 3 is shown and described as executing serially, it is to be understood and appreciated that the present invention is not limited by the illustrated order, as some aspects could, in accordance with the present invention, occur in different orders and/or concurrently with other aspects from that shown and described.

FIG. 3 illustrates a method 100 for adaptive electronic protection in a navigation system in accordance with an aspect of the present invention. At 102, temporal filtering is applied to each of a plurality of input streams to provide a plurality of filtered input streams. In one implementation, a coarse delay of an integer increment of samples at an associated sampling rate is applied, and the delayed input stream is provided to a finite impulse response (FIR) filter, having adaptively selected weights, to apply a fine delay to the input stream. At 104, a covariance matrix representing the plurality of filtered input streams is generated. At 106, a plurality of correlation results are generated, with each correlation result representing one of the plurality of filtered input streams.

At 108, a beam-forming weight is calculated for each input stream from the covariance matrix and the plurality of correlation results. In one implementation, the beam-forming weight for each input steam is calculated via an optimization process having at least one optimization constraint determined from the covariance matrix. The optimization process can also include, for example, further constraints derived from an integrated navigation data representing the position of a set of global navigation satellite system (GNSS) satellites as well locations of one or more other emitters not affiliated with the set of GNSS satellites, such as a spoofer or meaconer.

At 110, a spatially filtered correlation result is determined from the plurality of correlation results and the beam-forming weight for each input stream. For example, each correlation result can be multiplied by its associated weight, and the weighted correlation results can be summed to provide the spatially filtered correlation result. At 112, the spatially filtered correlation result is compensated for carrier phase biases due to spatial beam-forming if not the carrier phase bias compensation is not performed implicitly via optimization constraints. Once the phase compensation is complete, the spatially filtered correlation result can be provided to an associated navigation system for further processing.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications, and variations that fall within the scope of the appended claims.

What is claimed is:

1. A method for adaptive processing in a navigation system comprising:
    applying, at a receiver, temporal filtering to each of a plurality of input streams received at a plurality of antennas of the receiver to provide a plurality of filtered input streams;
    generating, at the receiver, a covariance matrix representing the plurality of received input streams;
    generating, at the receiver, a plurality of correlation results, each representing one of the plurality of filtered input streams; and
    calculating, at the receiver, a beam-forming weight for each received input stream via an optimization process that has at least one parameter determined based on the covariance matrix and at least one constraint determined based on the plurality of correlation results, wherein the at least one parameter during the optimization process provides a spatial null in a direction of an interfering signal above a noise floor and the at least one constraint during the optimization process provides a spatial null in a direction of another interfering signal below the noise floor.

2. The method of claim 1, wherein applying temporal filtering to each of a plurality of received input streams comprises:
    applying, at the receiver, a coarse delay to the received input stream comprising an integer increment of samples at an associated sampling rate; and
    applying, at the receiver, a finite impulse response (FIR) filter, having adaptively selected weights, to apply a fine delay to the received input stream.

3. The method of claim 1, wherein calculating, at the receiver, a beam-forming weight for each received input stream from the covariance matrix and the plurality of correlation results comprises calculating the beam-forming weight for each received input steam via an optimization process having at least one optimization constraint determined from the covariance matrix.

4. The method of claim 3, the optimization process comprising one of a minimum variance process, a minimum variance distortion-less response process, or adaptive filtering with bias constraints.

5. The method of claim 3, the optimization process being constrained by each of navigation data representing the position of a set of global navigation satellite system (GNSS) satellites and a location of an emitter that is not affiliated with the set of GNSS satellites.

6. The method of claim 1, further comprising:
    determining, at the receiver, a spatially filtered correlation result from the plurality of correlation results and the beam-forming weight for each received input stream; and
    compensating, at the receiver, the spatially filtered correlation result for carrier phase biases due to spatial beam-forming.

* * * * *